(12) United States Patent
Geyer et al.

(10) Patent No.: US 8,191,369 B2
(45) Date of Patent: Jun. 5, 2012

(54) TURBO-CHARGER SURGE DETECTION

(75) Inventors: Stephen Geyer, State Line, PA (US); Gregory J. Birky, Boonsboro, MD (US)

(73) Assignee: Mack Trucks, Inc., Greensboro, NC (US)

( * ) Notice: Subject to any disclaimer, the term of this patent is extended or adjusted under 35 U.S.C. 154(b) by 1080 days.

(21) Appl. No.: 10/578,435

(22) PCT Filed: Nov. 12, 2004

(86) PCT No.: PCT/US2004/037731
§ 371 (c)(1), (2), (4) Date: Nov. 24, 2004

(87) PCT Pub. No.: WO2005/047669
PCT Pub. Date: May 26, 2006

(65) Prior Publication Data
US 2011/0094220 A1    Apr. 28, 2011

Related U.S. Application Data

(60) Provisional application No. 60/518,648, filed on Nov. 12, 2003.

(51) Int. Cl.
 *F02B 33/44* (2006.01)
 *F02B 47/08* (2006.01)
(52) U.S. Cl. .............. 60/605.2; 123/568.11; 123/568.12
(58) Field of Classification Search .................. 60/605.2, 60/611, 608; 123/559.1, 568.11, 568.12
See application file for complete search history.

(56) References Cited

U.S. PATENT DOCUMENTS

| | | | |
|---|---|---|---|
| 5,560,208 A * | 10/1996 | Halimi et al. .................... | 60/608 |
| 6,035,639 A * | 3/2000 | Kolmanovsky et al. ...... | 60/605.2 |
| 6,178,749 B1 * | 1/2001 | Kolmanovsky et al. ...... | 60/605.2 |
| 6,205,785 B1 | 3/2001 | Coleman | |
| 6,279,551 B1 * | 8/2001 | Iwano et al. ................... | 123/564 |
| 6,298,718 B1 * | 10/2001 | Wang .......................... | 73/114.01 |
| 6,324,848 B1 | 12/2001 | Gladden et al. | |
| 6,401,457 B1 * | 6/2002 | Wang et al. ..................... | 60/599 |
| 6,470,864 B2 | 10/2002 | Kim et al. | |
| 6,543,230 B1 * | 4/2003 | Schmid ........................ | 60/605.2 |
| 6,568,173 B1 * | 5/2003 | Kolmanovsky et al. ......... | 60/280 |
| 6,588,210 B2 * | 7/2003 | Kreso ............................. | 60/602 |
| 6,604,361 B2 * | 8/2003 | Buckland et al. ............ | 60/605.2 |
| 6,691,685 B2 | 2/2004 | Jones et al. | |
| 6,725,660 B2 | 4/2004 | Hidaka | |

(Continued)

FOREIGN PATENT DOCUMENTS
JP          03100398 A  *  4/1991

*Primary Examiner* — Thomas Denion
*Assistant Examiner* — Cameron Setayesh
(74) *Attorney, Agent, or Firm* — Martin Farrell; Michael Pruden

(57) ABSTRACT

A method of turbo-charger surge detection may include the steps of measuring a rate of air flow through a turbo-charger compressor, measuring a temperature of the air flow, calculating a standard mass flow rate of the air flow at the rate and the temperature, measuring a pressure ratio across the turbo-charger compressor, calculating a surge mass flow rate at a surge line of the compressor at the pressure ratio, comparing the standard mass flow rate to the surge mass flow rate, and reducing an EGR flow or reducing the pressure ratio by opening a vane of the compressor if the standard mass flow rate is lower than the surge mass flow rate.

5 Claims, 4 Drawing Sheets

U.S. PATENT DOCUMENTS

| | | | |
|---|---|---|---|
| 6,725,847 B2 * | 4/2004 | Brunemann et al. | 123/568.12 |
| 6,779,344 B2 | 8/2004 | Hartman et al. | |
| 7,127,892 B2 * | 10/2006 | Akins et al. | 60/600 |
| 7,322,194 B2 * | 1/2008 | Sun et al. | 60/605.2 |
| 7,958,730 B2 * | 6/2011 | Stewart | 60/612 |
| 2002/0043066 A1 * | 4/2002 | Finger et al. | 60/602 |
| 2002/0139361 A1 * | 10/2002 | Itoyama et al. | 123/698 |
| 2003/0051475 A1 * | 3/2003 | Allen et al. | 60/608 |
| 2003/0183212 A1 | 10/2003 | Gottemoller et al. | |
| 2003/0192516 A1 * | 10/2003 | Brunemann et al. | 123/568.12 |
| 2005/0178123 A1 * | 8/2005 | Uchiyama et al. | 60/605.2 |
| 2005/0257520 A1 * | 11/2005 | Fischle et al. | 60/600 |
| 2006/0021344 A1 * | 2/2006 | Barba et al. | 60/599 |
| 2006/0032224 A1 * | 2/2006 | Akins et al. | 60/602 |
| 2006/0042608 A1 * | 3/2006 | Buck et al. | 123/568.12 |
| 2006/0086089 A1 * | 4/2006 | Ge | 60/599 |
| 2006/0137347 A1 * | 6/2006 | Stewart et al. | 60/605.2 |

* cited by examiner

TURBO-CHARGER SURGE DETECTION

CROSS-REFERENCE TO RELATED APPLICATIONS

This application is a National Phase of International Application Serial No. PCT/U.S.2004/037731, filed 12 Nov. 2004, which claims benefit of U.S. Provisional Application Ser. No. 60/518,648, filed 12 Nov. 2003.

BACKGROUND OF THE INVENTION

1. Field of the Invention

This invention relates to the field of turbo-charger surge detection.

2. Description of the Related Art

An internal combustion engine may include a supercharger or a turbo-charger for compressing intake air prior to delivery to the combustion chambers. A super-charger is typically belt or gear-driven, while a turbo-charger has a turbine which is driven by the engine's exhaust gases. The belt or gears, in the case of a supercharger, or the turbine, in the case of a turbocharger, drives a compressor which compresses the intake air. The compressor, which may be a centrifugal or rotary pump, receives air to be compressed on an inlet side and supplies the air to the combustion chambers from an outlet side. The difference in pressure of the outlet side relative to the inlet side is termed the pressure ratio, and represents the amount of boost the compressor is supplying to the intake air.

In FIG. 1 is shown a compressor map 100 for a turbo-charger compressor. Pressure ratios 102 are plotted on the vertical axis and rates of flow 104 are plotted on the horizontal axis. As may be seen in FIG. 1, an operating region 106 of the compressor is bounded on the left side of the compressor map by a surge line 108.

Surge occurs when rate of flow 104 through the compressor is too small to support the prevailing pressure ratio 102. Surge line 108 represents this condition for various rates of flow 104. When rate of flow 104 is too small to support the prevailing pressure ratio 102, the air flow will cavitate, separating from the suction side of the blades or vanes of the compressor wheel and reversing air flow through the compressor until pressure ratio 102 is reduced. If the surge conditions continue to prevail, pressure ratio 102 will build up again and the cycle will be repeated. This cycle of rising and falling pressure ratios 102 may continue at a substantially fixed frequency. Surge makes a popping noise and stresses the piping between the turbo-charger and the inlet to the engine. The popping noise is called surging or barking. Customers using a truck that has this surging or barking dislike it and are afraid that it is causing damage to their truck and the engine.

The interaction between the turbo-charger, such as a variable geometry turbo-charger, and an EGR system may exacerbate a back flow of gas through the turbo-charger compressor. An EGR system may provide exhaust gas downstream of the compressor to avoid soaking the compressor in corrosive exhaust gases. The recirculated exhaust gas entering the air flow downstream of the compressor may add to the pressure at the outlet of the compressor, raising pressure ratio 102 artificially and promoting surge.

SUMMARY OF THE INVENTION

A primary object of the invention is to overcome the deficiencies of the related art described above by providing a turbo-charger surge detection method and system. The present invention achieves these objects and others by providing a turbo-charger surge detection method and system.

In several aspects, the invention may provide a turbo-charger surge detection method and system. In particular, in a first aspect, a method of turbo-charger surge detection may include the steps of measuring a rate of air flow through a turbo-charger compressor, measuring a temperature of the air flow, calculating a standard mass flow rate of the air flow at the rate and the temperature, measuring a pressure ratio across the turbo-charger compressor, calculating a surge mass flow rate at a surge line of the compressor at the pressure ratio, comparing the standard mass flow rate to the surge mass flow rate, and reducing an EGR flow if the standard mass flow rate is lower than the surge mass flow rate.

In a second aspect, a method of turbo-charger surge detection may include the steps of measuring a rate of air flow through a turbo-charger compressor, measuring a temperature of the air flow, calculating a standard mass flow rate of the air flow at the rate and the temperature, measuring a pressure ratio across the turbo-charger compressor, calculating a surge mass flow rate at a surge line of the compressor at the pressure ratio, comparing the standard mass flow rate to the surge mass flow rate, and reducing the pressure ratio by opening a vane of the compressor if the standard mass flow rate is lower than the surge mass flow rate.

In a third aspect, a system for turbo-charger surge detection may include means for measuring a rate of air flow through a turbo-charger compressor, means for measuring a temperature of the air flow, means for calculating a standard mass flow rate of the air flow, means for measuring a pressure ratio across the turbo-charger compressor, means for calculating a surge mass flow rate at a surge line of the compressor, means for comparing the standard mass flow rate to the surge mass flow rate, and means for reducing an EGR flow if the standard mass flow rate is lower than the surge mass flow rate.

In a fourth aspect, a system for turbo-charger surge detection may include means for measuring a rate of an air flow through a turbo-charger compressor, means for measuring a temperature of the air flow, means for calculating a standard mass flow rate of the air flow, means for measuring a pressure ratio across the turbo-charger compressor, means for calculating a surge mass flow rate at a surge line of the compressor, means for comparing the standard mass flow rate to the surge mass flow rate, and means for reducing the pressure ratio by opening a vane of the compressor.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
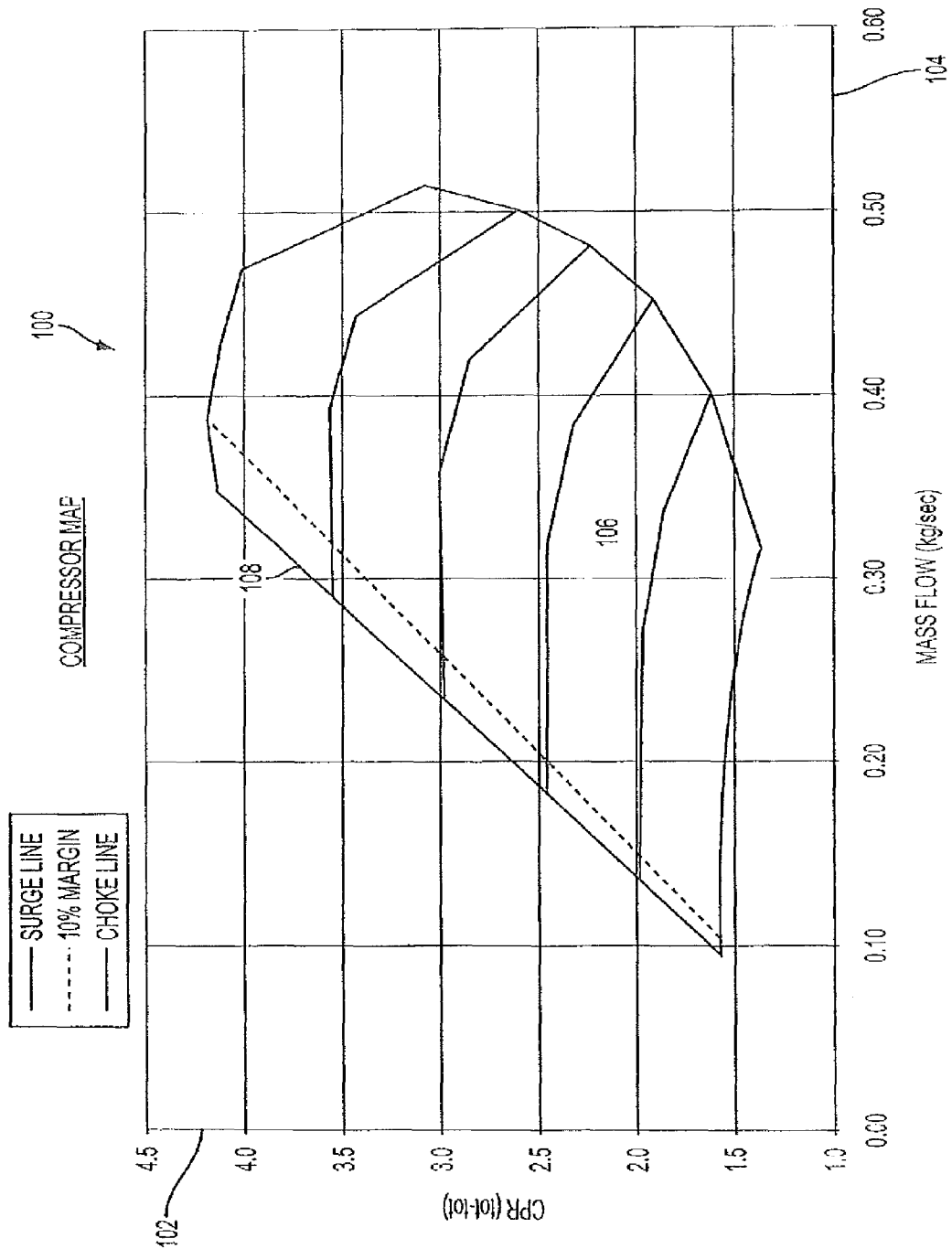
FIG. 1 is compressor map.
Figure 2:
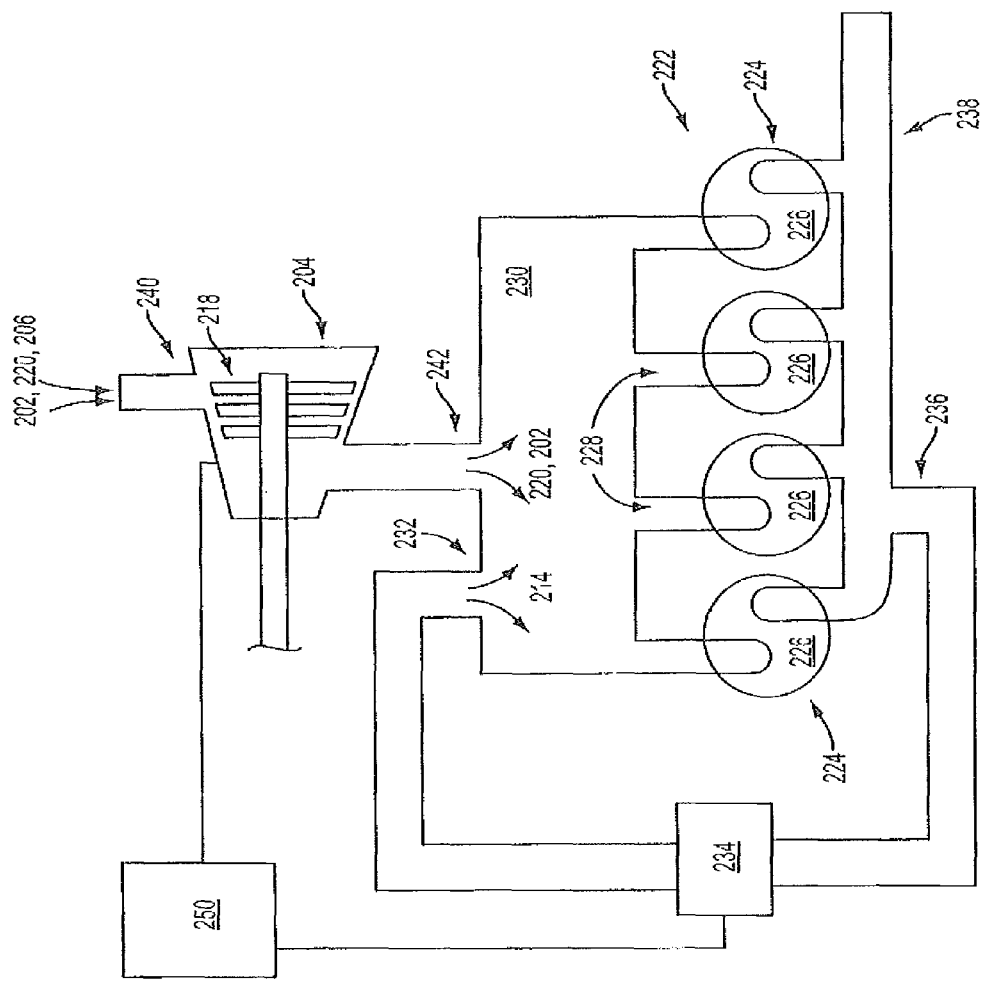
FIG. 2 is a schematic diagram of a turbo-charged internal combustion engine for use with an embodiment of the invention.

In FIG. 2 is shown a schematic diagram of a turbo-charged internal combustion engine 222 for use with an embodiment of the invention. Turbo-charged internal combustion engine 222 may include a plurality of cylinders 224, each having a combustion chamber 226 fed by a runner 228 of an intake manifold 230. A compressor 204 may provide pressurized intake air 202 to intake manifold 230. Compressor 204 may have an inlet 240 receiving low pressure air 202, which may be at ambient pressure, and an outlet 242 plumbed to intake manifold 230. Also plumbed to intake manifold 230 may be an outlet 232 of an EGR valve 234. An inlet 236 of EGR valve 234 may scavenge exhaust gases from an exhaust manifold 238 also connected to combustion chambers 226.

It would be desirable if a vane position of compressor 204 could be adjusted when compressor 204 was at the point of surging to lower the pressure ratio across compressor 204 and avert surge. It would further be desirable if EGR flow into intake manifold 230 downstream from the compressor could be reduced when compressor 204 was at the point of surging to lower the pressure ratio across compressor 204 and avert surge.

Figure 3:
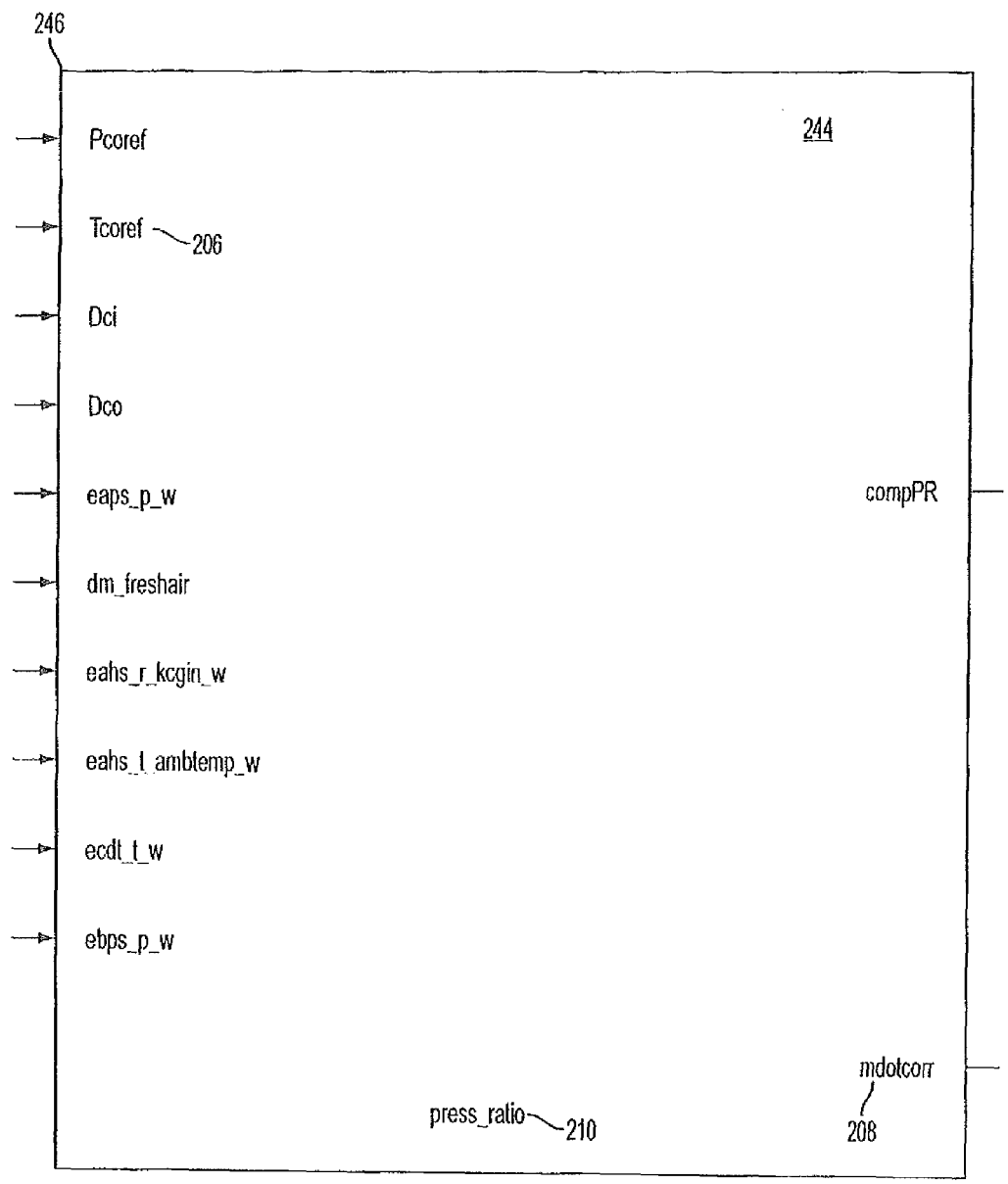
FIG. 3 is a schematic diagram of a control algorithm according to a first embodiment of the invention.
Figure 4:
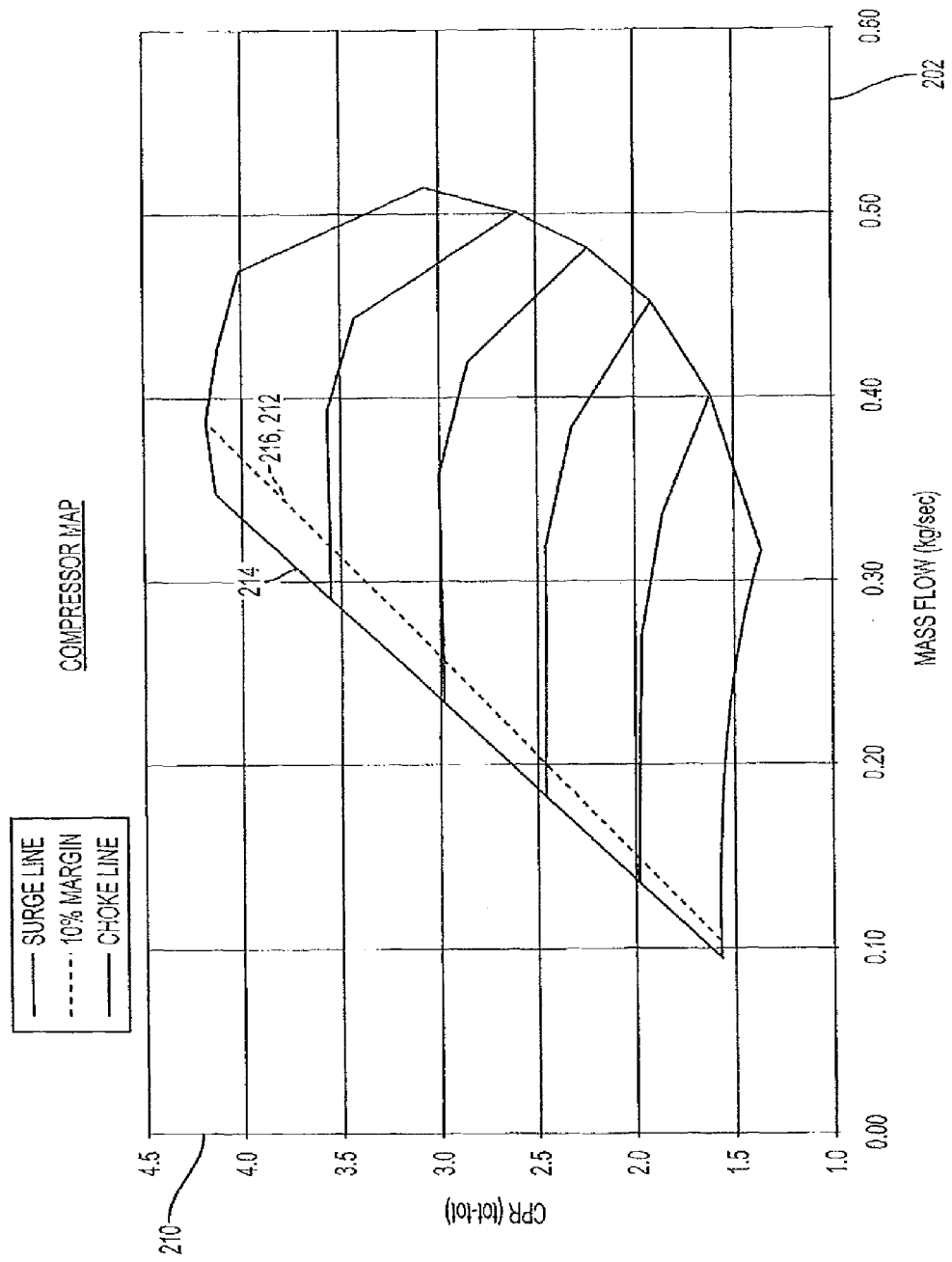
FIG. 4 is compressor map for use with an embodiment of the invention.

In FIG. 3 is shown a schematic diagram 244 of a control algorithm for turbo-charged internal combustion engine 222. Input parameters 246 shown on the left side of the diagram 244 are evaluated to determine where compressor 204 is operating relative to surge line 108. An actual mass air flow 202 through compressor 204 and a temperature 206 are used to calculate a standard mass flow rate 208 at the reference conditions for compressor 204 (mdotcorr). A pressure ratio 210 of compressor 204 is determined from the input sensors (CPR) and used to lookup a mass flow rate 212 at compressor 204's surge line 108. The look up curve has some surge margin 216 added, as shown in FIG. 4.

Standard mass flow rate 208 at compressor 204 reference condition is compared to mass flow rate 212 at surge line 108 (plus surge margin 216) to determine if compressor 204 is close to surge. After this comparison, a controller 250 may reduce an EGR flow 214 proportionally to force more mass air flow 202 through compressor 204, thus eliminating surging of compressor 204 when no surge margin 216 is available. Otherwise the desired EGR flow request is passed directly without any reduction. Modifying EGR valve 234 position to reduce an EGR flow 214 may improve air flow 202 through compressor 204, thus improving surge margin 216.

Pressure ratio 210 of compressor 204 can also be lowered by opening the turbo-charger compressor 204 vane 218 position to further improve surge margin 216. Any combination of events can be used to improve surge margin 216 of compressor 204. Modify EGR valve 234 position only, modify EGR valve 234 position first followed by opening turbo-charger vane 218 position, opening turbo-charger vane 218 position first followed by modifying EGR valve 234 position, or only opening turbo-charger vane 218 position.

Two additional cases for turbo-charger interaction with the EGR system were found under rapid deceleration of the engine either in braking mode or without braking.

Case 1: EGR valve 234 must be rapidly closed to prevent back flow of gas through compressor 204. The natural action of the EGR system with a quick removal of fuel rate is to increase the EGR flow rate 214 to maintain the desired air to fuel ratio. The turbo-charger is still delivering a high flow rate of air 202 without the fuel to go with it. The EGR system will try to compensate with a higher amount of EGR thus reducing the flow of air 202 through compressor 204. This leads to a back flow of gas through compressor 204 because there is not enough power left to spin the turbo-charger at the given pressure ratio 210. The turbo-charger vane 218 position can also be reduced in combination with EGR valve 234 closure to remove the demand for compressor 204 as a function of a quick removal of fuel rate.

Case 2: The turbo-charger vane 218 position may also be modified quickly in the case of rapid deceleration of the engine with the brake applied. Energy must be removed from the system in a quick controlled manner to prevent the barking (popping noise) of the turbo-charger. Braking mode requires less flow rate of air 202 compared to the powered operation flow rate of air 202. A back flow of gas through compressor 204 occurs with the rapid change in air usage.

In particular, in a first embodiment, a method of turbo-charger surge detection 200 may include the steps of measuring a rate 220 of air flow 202 through a turbo-charger compressor 204, measuring a temperature 206 of air flow 202, calculating a standard mass flow rate 208 of air flow 202 at rate 220 and temperature 206, measuring a pressure ratio 210 across turbo-charger compressor 204, calculating a surge mass flow rate 212 at a surge line 214 of compressor 204 at pressure ratio 210, comparing standard mass flow rate 208 to surge mass flow rate 212, and reducing an EGR flow 214 if standard mass flow rate 208 is lower than surge mass flow rate 212.

In one embodiment, the method of turbo-charger surge detection may also include the step of adding a surge margin 216 to surge mass flow rate 212.

In one embodiment, method of turbo-charger surge detection 200 may also include the step of reducing pressure ratio 210 by opening a vane 218 of compressor 204.

In a second embodiment, a method of turbo-charger surge detection 300 may include the steps of measuring rate 220 of air flow 202 through turbo-charger compressor 204, measuring temperature 206 of air flow 202, calculating a standard mass flow rate 208 of air flow 202 at rate 220 and temperature 206, measuring a pressure ratio 210 across turbo-charger compressor 204, calculating a surge mass flow rate 212 at a surge line 214 of compressor 204 at pressure ratio 210, comparing standard mass flow rate 208 to surge mass flow rate 212, and reducing pressure ratio 210 by opening a vane 218 of compressor 204 if standard mass flow rate 208 is lower than surge mass flow rate 212.

In one embodiment, method of turbo-charger surge detection 300 may also include the step of adding a surge margin 216 to surge mass flow rate 212.

EXAMPLE I

An example of a turbo-charger surge detection program for use with an embodiment of the invention follows.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A method of turbo-charger surge detection comprising:
    measuring a rate of air flow through a turbo-charger compressor;
    measuring a temperature of said air flow;
    calculating a standard mass flow rate of said air flow at said rate and said temperature;
    measuring a pressure ratio across said turbo-charger compressor;
    calculating a surge mass flow rate at a surge line of said compressor at said pressure ratio;
    comparing said standard mass flow rate to said surge mass flow rate; and
    reducing an EGR flow if said standard mass flow rate is lower than said surge mass flow rate.

2. The method of turbo-charger surge detection of claim 1, comprising further:
    adding a surge margin to said surge mass flow rate.

3. The method of turbo-charger surge detection of claim 1, comprising further:
    reducing said pressure ratio by opening a vane of said compressor.

4. A method of turbo-charger surge detection comprising:
    measuring a rate of air flow through a turbo-charger compressor;
    measuring a temperature of said air flow;
    calculating a standard mass flow rate of said air flow at said rate and said temperature;
    measuring a pressure ratio across said turbo-charger compressor;
    calculating a surge mass flow rate at a surge line of said compressor at said pressure ratio;
    comparing said standard mass flow rate to said surge mass flow rate; and
    reducing said pressure ratio by opening a vane of said compressor and reducing an EGR flow if said standard mass flow rate is lower than said surge mass flow rate.

5. The method of turbo-charger surge detection of claim 4, comprising further:
    adding a surge margin to said surge mass flow rate.

* * * * *